United States Patent Office 3,088,967
Patented May 7, 1963

---

3,088,967
PREPARATION OF 1-CYCLOHEXENES
Philip J. Paré, Yorktown Heights, N.Y., assignor to American Cyanamid Company, New York, N.Y., a corporation of Maine
No Drawing. Filed Feb. 24, 1961, Ser. No. 91,308
7 Claims. (Cl. 260—464)

This invention relates to a novel process for isomerizing 3-cyclohexenes. More particularly, it relates to the vapor phase isomerization of 3-cyclohexenes. Still more particularly, the invention is concerned with the vapor phase isomerization in the presence of a lead salt catalyst of 3-cyclohexenes containing an active group or radical on the 1-carbon atom resulting in the corresponding 1-cyclohexenes.

Heretofore, attempts to isomerize 3-cyclohexenes containing an active nitrile or amide group on the 1-carbon atom have unfortunately been unsuccessful. The latter active group is usually affected during the course of conventional isomerization treatments. Resultant 1-cyclohexenes have, in the main, been a laboratory curiosity because the isomerization affecting unsaturation in the 3-position also modifies the active group on the 1-carbon atom. Since 1-cyclohexenes containing a reactive grouping in the conjugated position are found to be valuable both as intermediates in the preparation of aliphatic dicarboxylic acids and as copolymerizing compounds, an economical process for their preparation, if one could be so devised, would indeed be desirable.

It is, therefore, a principal object of the invention to provide a process for the isomerization of 3-cyclohexenes to 1-cyclohexenes. It is another object of the invention to provide a process for the vapor phase isomerization of 3-cyclohexenes containing a reactive group on the 1-carbon atom to the corresponding, otherwise unmodified 1-cyclohexenes. Other objects and advantages will appear from a consideration of the following detailed description.

To this end, a method is provided for isomerizing 3-cyclohexenes in the vapor phase to 1-cyclohexenes containing a reactive group on the 1-carbon atom. Unexpectedly, the reactive group remains substantially unchanged when the vapor phase reaction is carried out in the presence of a lead salt catalyst. According to the process of the present invention, the vapor phase reaction is carried out at temperatures between about 300° C. and 450° C. by passing a 3-cyclohexene over a lead salt catalyst. Isomerization is quickly accomplished usually within sixty seconds or less.

The 3-cyclohexenes subjected to vapor phase isomerization include those compounds represented by the structure:

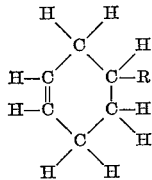

where R is —CN, —COOH, —COOR', —CONH₂ or —CH₂NH₂ and where R' is a lower alkyl of from one to four carbon atoms, such as methyl, ethyl, propyl, isopropyl, normal butyl or tertiary butyl. Any 3-cyclohexene containing a reactive group on the 1-carbon atom may be employed. The invention will be more fully illustrated hereinbelow by utilizing 3-cyclohexene-1-carbonitrile, as a typical 3-cyclohexene, treated in accordance with the process described and claimed.

In general, 3-cyclohexene-1-carbonitrile is prepared by methods known in the art. One such method involves the Diels-Alder reaction between acrylonitrile and 1,4-butadiene. The defined 3-cyclohexene is conventionally passed through a heated tube or suitable thermally insulated vessel containing a lead-salt catalyst. The vessel and contents are maintained at temperatures between about 300° C. and 450° C., and preferably between 340° C. and 360° C. The contact or residence time of cyclohexene subjected to isomerization is not more than about one minute, although five or ten seconds or less have been advantageously employed. Of course, where a contact time of five or ten seconds is contemplated, the elevated temperatures in the neighborhood of about 400° C. should be employed.

Illustrative lead-salt catalysts are, for instance: lead acetate, lead sulfate, lead oxide and lead chromate. These catalysts are usually deposited on absorbent materials such as silica gel, charcoal and glass wool. It has been found that the use of lead acetate on silica gel provides optimum results, since the conversion to the desired product is readily accomplished in good yield and purity.

As indicated above, any suitable thermally insulated corrosion resistant reactor may be employed herein. For example, Pyrex glass, or quartz tube may be advantageously used to form the vessel per se, or the lining of the same. The reactor is, of course packed with the indicated catalyst.

For purposes of clarification, the invention will be illustrated by reference to the following examples. These are to be taken as illustrative only and not to be deemed limitative of the instant invention.

Example 1

One mol of 3-cyclohexene-1-carbonitrile, preheated to 150° C. is introduced into a thermally insulated vycor tube, maintained at a temperature of about 350° C., packed with lead acetate absorbed on silica gel. The nitrile is then contacted within the reaction tube for a period of about thirty seconds. The reaction mixture is then permitted to leave the reaction vessel and condensed in a suitable receiver placed in a Dry-Ice acetone bath maintained at temperatures of about —80° C. After all the vapors have been collected and condensed in the cooled reaction vessel, the vessel is removed from the bath and permitted to come to room temperatures. The distillation of the reaction porduct is finally accomplished yielding a mixture of the isomerized product and some unreacted material. Upon analysis, the conversion of the 3-cyclohexene-1-carbonitrile to 1-cyclohexene-1-carbonitrile is found to be about 80 percent and a yield of about 95 percent of the desired isomerized product is obtained.

Example 2

Repeating Example 1 in every detail except that 3-cyclohexene-1-carboxylic acid is substituted for the 3-cyclohexene-1-carbonitrile, and the reaction vycor tube is maintained at temperatures of about 400° C. The contact time necessary for conversion to the corresponding 1-cyclohexene is found to be twelve seconds. On analysis, a yield of about 95 percent of the desired isomerized product is obtained.

Similar results are noted when 3-cyclohexene-1-carboxylic acid, methyl or ethyl ester, or 3-cyclohexene-1-carboxamide, or 3-cyclohexene-1-methylamine is isomerized as in Example 1 above.

To illustrate the utility of the isomerized compounds as copolymerizing agents, the following example is presented.

Example 3

1-cyclohexene-1-carbonitrile is copolymerized with styrene employing 49 mol percent feed of styrene and 51 mol percent feed of 1-cyclohexene-1-carbonitrile employing conventional polymerization emulsion technique. Resultant copolymer is cast on a glass plate and then stripped therefrom. On analysis, the resultant copolymer indicated a nitrogen content of 0.93%. On this basis, it is calculated that 7.1% of the cyanomethylene group has been incorporated into the polymer.

The polymer is next subjected to a dyeing test employing a dyestuff whose coloring components are: Acid Blue No. 8 (Color Index 50335), Acid Red No. 94 (Color Index 256), Direct Blue No. 1 (Color Index 24410), Direct Yellow No. 1 (Color Index 40000) and Disperse Yellow No. 5 (Color Index 12792). The test is carried out by placing the polymer in a boiling 1% aqueous solution of the dyestuff for one minute and is then removed from the dye bath. It is next washed for five minutes in warm water. The copolymer changes in color from white to brown similar to the color which wool takes on when treated with the above dyestuff in the same manner.

I claim:

1. A process for preparing 1-cyclohexenes from 3-cyclohexenes containing a reactive group on the 1-carbon atom of the molecule which comprises the steps of: subjecting a 3-cyclohexene having the general formula:

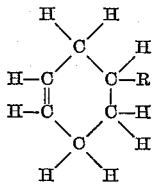

where R is a reactive radical selected from the group —CN, —COOH, —COOR', —CONH$_2$ and —CH$_2$NH$_2$, and where R' is an alkyl radical of from one to four carbon atoms, to a temperature between about 300° C. and 450° C. for a contact period within about five to about sixty seconds in the presence of a lead salt catalyst selected from the group consisting of lead acetate, lead sulfate, lead oxide and lead chromate, removing the so-isomerized 1-cyclohexene compound containing said unmodified reactive radical and recovering the same.

2. The process according to claim 1, wherein the 3-cyclohexene to be treated is 3-cyclohexene-1-carboxylic acid.

3. The process according to claim 1, wherein the 3-cyclohexene to be treated is 3-cyclohexene-1-carboxamide.

4. The process according to claim 1, wherein the cyclohexene to be treated is 3-cyclohexene-1-methylamine.

5. The process according to claim 1, wherein the cyclohexene to be treated is 3-cyclohexene-1-carbonitrile.

6. The process according to claim 5, wherein the temperature employed is about 350° C. and a contact time of about five to ten seconds.

7. The process according to claim 5, in which the catalyst is lead acetate absorbed on silica gel.

References Cited in the file of this patent
UNITED STATES PATENTS
2,826,609    Kamlet _____ Mar. 11, 1958